US007609618B1

(12) United States Patent
Biswas et al.

(10) Patent No.: US 7,609,618 B1
(45) Date of Patent: Oct. 27, 2009

(54) DYNAMICALLY CONTROLLING HSRP PREEMPTION DEPENDENT ON STATEFUL NAT CONVERGENCE

(75) Inventors: Kaushik Biswas, San Jose, CA (US); Ian Wilson, Edinburgh (GB); Siva Jayasenan, Cupertino, CA (US); Sepehr Safari, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 733 days.

(21) Appl. No.: 11/303,555

(22) Filed: Dec. 15, 2005

(51) Int. Cl.
*H04L 12/56* (2006.01)
*G06F 11/00* (2006.01)

(52) U.S. Cl. .................. 370/218; 370/220; 370/244; 370/401

(58) Field of Classification Search ................. None
See application file for complete search history.

(56) References Cited

U.S. PATENT DOCUMENTS

| 6,687,245 | B2 * | 2/2004 | Fangman et al. ............ 370/356 |
| 7,042,876 | B1 * | 5/2006 | Jayasenan et al. ........... 370/389 |
| 7,227,872 | B1 * | 6/2007 | Biswas et al. ............... 370/465 |
| 7,260,649 | B1 * | 8/2007 | Somasundaram et al. ... 709/245 |
| 7,280,557 | B1 * | 10/2007 | Biswas et al. ............... 370/465 |
| 7,486,611 | B1 * | 2/2009 | Wilson ....................... 370/220 |
| 2005/0147028 | A1 * | 7/2005 | Na et al. ..................... 370/217 |
| 2006/0092856 | A1 * | 5/2006 | Mitsumori .................. 370/254 |
| 2006/0120279 | A1 * | 6/2006 | Mitsumori .................. 370/218 |
| 2006/0120366 | A1 * | 6/2006 | Jayasenan et al. ........... 370/389 |

OTHER PUBLICATIONS

T. Li et al., "Cisco Hot Standby Router Protocol (HSRP)," Mar. 1998, retrieved from the internet: < URL: http://www.ietf.org/rfc/rfc2281.txt>, retrieved on Mar. 22, 2006. (15 pages).
Cisco Systems, Inc., Release 12.4T New Features and Hardware Support, No. 3001 retrieved from the internet: < URL: http://www.cisco.com/en/US/products/ps6441/prod_bulletin09186a...>, retrieved on Mar. 22, 2006. (72 pages).

(Continued)

*Primary Examiner*—Chi H Pham
*Assistant Examiner*—Soon-Dong D Hyun
(74) *Attorney, Agent, or Firm*—Hickman Palermo Truong & Becker LLP

(57) ABSTRACT

The invention relates to a method for switchover from an active node to a standby node wherein when a standby network node restarts, designation of the standby node as a new active node is delayed according to 1) the period of a delay timer and 2) a counter indicating the number of data messages the standby node will be receiving from the active network node. The active node sends a notification to the standby node identifying a number of data messages that the active network node needs to send to the standby node. The standby node stores the number in a counter and decrements the counter upon receiving data messages. When the delay timer expires, the standby network node transitions to become the new active node only when the counter has reached zero. If the counter is not yet zero, then the switchover delay timer is restarted and the cycle repeats.

27 Claims, 4 Drawing Sheets

OTHER PUBLICATIONS

Cisco Systems, Inc., "HSRP Commands on Cisco IOS XR Software," retrieved retrieved from the internet: < URL: http://www.cisco.com/univercd/cc/td/doc/product/software/iosxr3/ad...>, retrieved on Mar. 22, 2006. (17 pages).

Cisco Systems, Inc., "Nonstop Forwarding with Stateful Switchover on the Cisco Catalyst 6500," retrieved from the internet: < URL: http://www.cisco.com/en/US/products/hw/switches/ps708/products_...>, retreived on Mar. 22, 2006. (12 pages).

Cisco Systems, Inc., "Nonstop Forwarding with Stateful Switchover on the Cisco Catalyst 6500," White Paper, 2005. (16 pages).

* cited by examiner

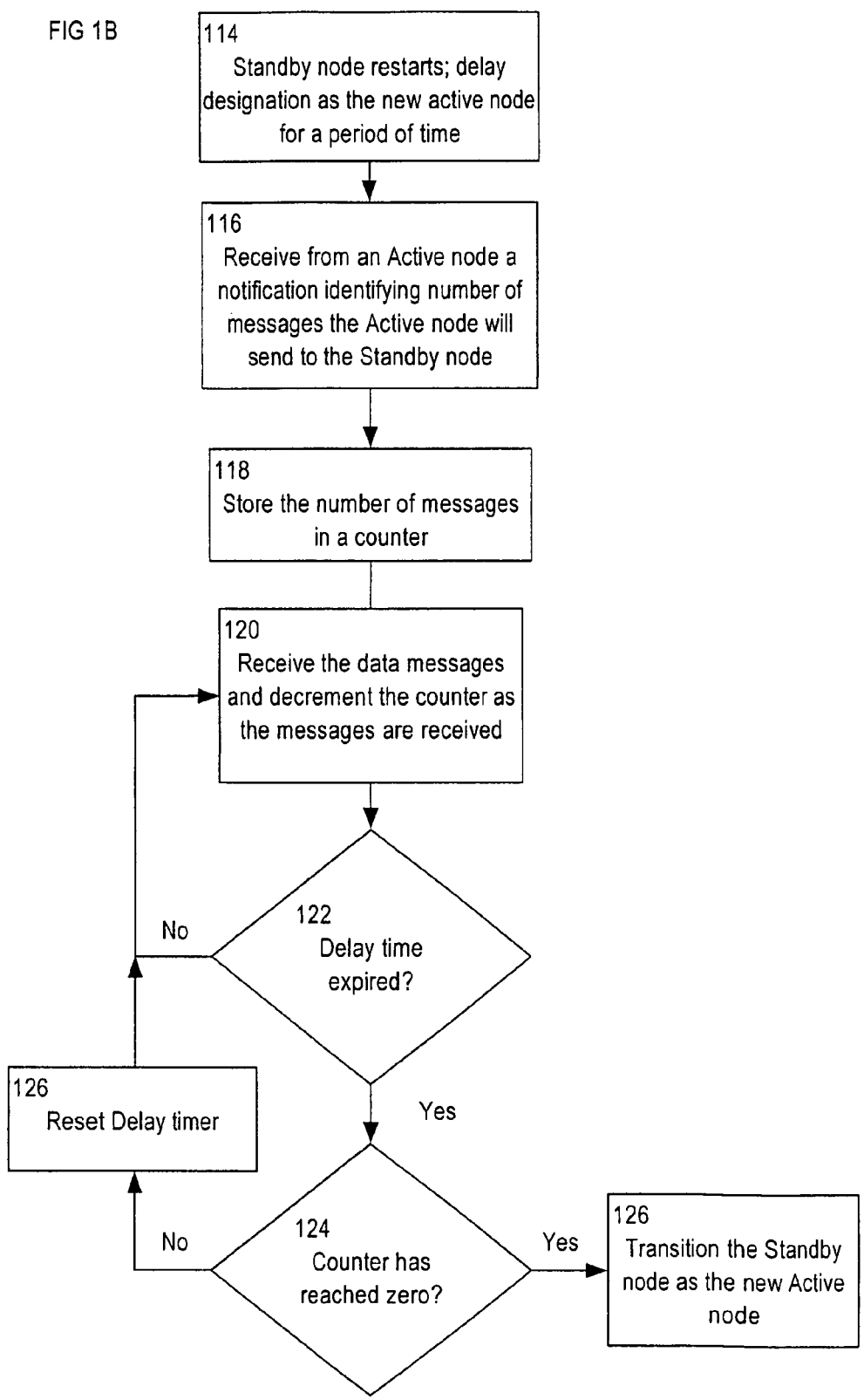

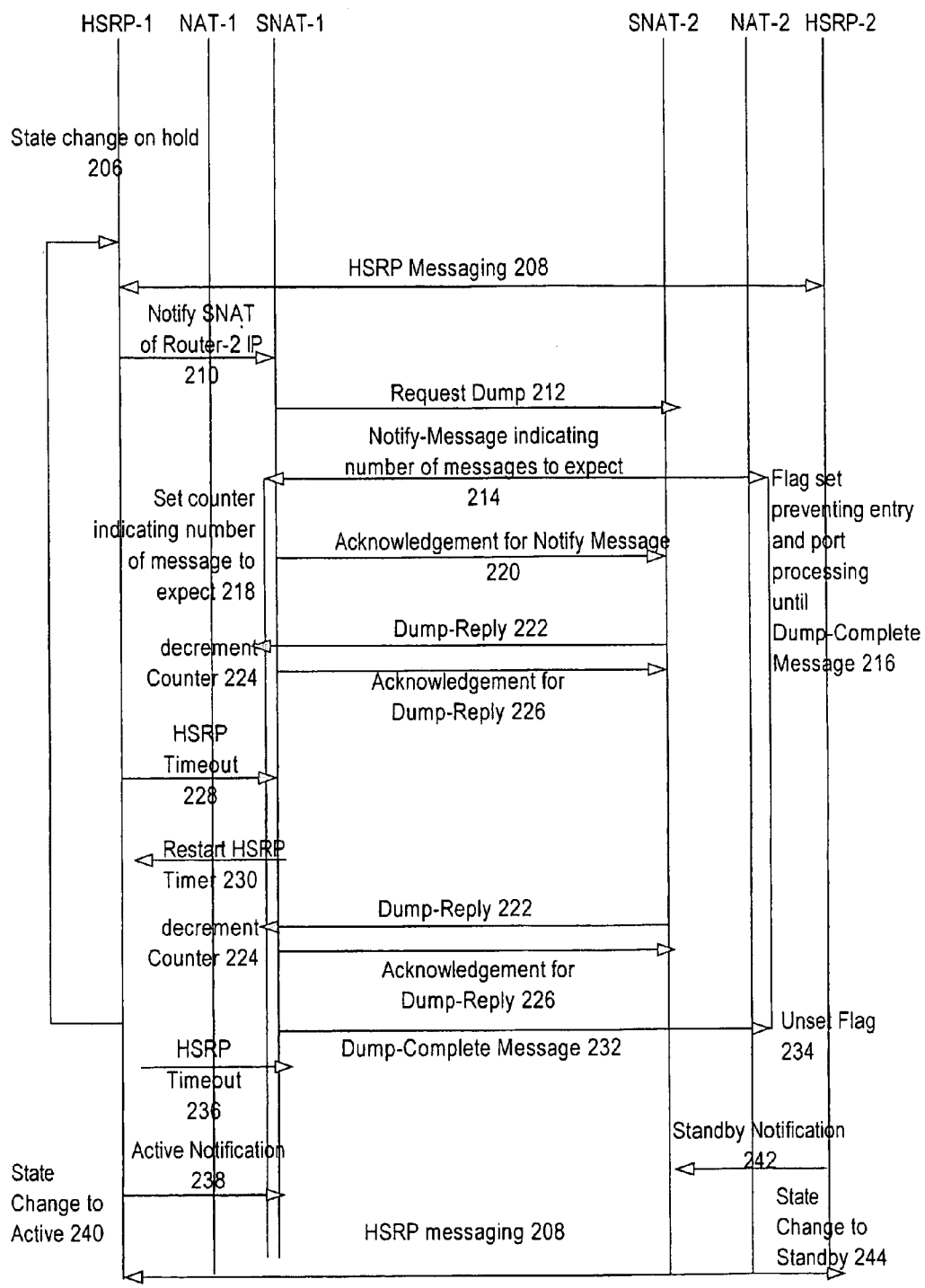

DYNAMICALLY CONTROLLING HSRP PREEMPTION DEPENDENT ON STATEFUL NAT CONVERGENCE

FIELD OF THE INVENTION

The present invention generally relates to controlling switchover from an active network node to a standby network node. The invention relates more specifically to techniques for dynamically controlling switchover preemption during table convergence of network address translators.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Modern computer networks based on routers, switches and other infrastructure elements generally are reliable and can offer clients robust service. Consequently, end users have become less tolerant of failure and delay in network communication. Further, entities that make or lose money based upon the reliability of network equipment, such as those in the field of online commerce, are especially intolerant of network problems. Nevertheless, client devices are most adversely affected when a critical service goes down. Therefore, customers and network gear vendors are seeking ways to provide equipment that has greater fault tolerance.

Many services are provided by networks that implement Network Address Translators (NAT) at the borders of private networks or sub domains. NAT is a network node function. For example, NAT is implemented in a router that allows addresses inside a sub domain to be reused by any other sub domains. The NAT network node allows address reuse by saving a sub domain computer's non-routable IP address to an address translation table. The network node replaces the sending computer's non-routable IP address with the first available IP address out of the range of unique IP addresses. The translation table then stores a mapping of the computer's non-routable IP address matched with the one of the unique IP addresses.

When a packet is returned from an end host outside the sub domain, the NAT network node checks the destination address on the packet. The NAT network node then looks in the address translation table to see which computer on the sub domain the packet belongs to. The NAT network node changes the destination address to the one saved in the address translation table and sends it to that computer. If the NAT network node does not find a match in the table, it drops the packet. The sub domain computer receives the packet from the network node. The process repeats as long as the computer is communicating with the external system.

In a network that relies on NAT enabled nodes, it is critical that those computers within the sub domain can communicate with the NAT network nodes. If the NAT network node for a given sub domain goes down, then all communication between the sub domain and other nodes or domains will cease. Therefore, many networks that implement NAT enabled nodes rely on one or more nodes to store and perform the Network Address Translation. Typically, an active network node is elected to generate the table and relay the traffic between the private inside sub domain and the outside public domain. Additionally, a standby network node is elected to be a backup in case the active node goes down. The active network node will create and distribute the NAT information to the standby network node. The standby network node will create a copy of the active network node's information in its database or "NAT table." A switchover protocol, such as HSRP as defined in T. Li, "Cisco Hot Standby Routing Protocol," IETF Request for Comments (RFC) 2281, March 1998, controls when a standby network node becomes the active network node.

In the case where the active network node goes down, HSRP elects the standby network node as the new active node. Because the standby network node maintains a copy of the NAT information, traffic between the hosts will flow without any interruption. While the standby network node is active, traffic flows as usual and thus, new NAT sessions will be created and stored in the NAT table as traffic flows through the standby network node.

When a network node is brought back up or re-started, HSRP will re-establish the re-started node as the active node. If the re-started node is established as the active node before learning the existing flow-information, the newly active node will incorrectly handle existing NAT sessions. Specifically, if the NAT sessions were TCP sessions and the sequence numbers or acknowledgement numbers were changed in the NAT table of the standby node, the newly started active network node would not have obtained the correct sequence number or acknowledgement number, and therefore incorrectly handle the ongoing session.

One approach to address this problem is to use HSRP preemption to delay the newly active network node from resuming handling traffic. During the delay, the newly active node would request and receive the current NAT table information. However, in this approach HSRP allows for a static, fixed amount of time to be set as the delay time until the newly active network node resumes traffic handling. Further, the newly active network node is delayed from performing traffic forwarding until the time on the HSRP preemption has expired; therefore, the timer is normally made short, to minimize the length of time during which traffic forwarding cannot occur. Once the timer has expired, the newly active network node resumes traffic handling regardless of whether the newly active node has received the current NAT table information.

The use of the HRSP static preemption is problematic when the NAT table size cannot be pre-determined. It is hard to determine during configuration time what the NAT table size will be, and therefore accurately setting a fixed delay time is difficult. If the NAT Table is large and takes more time than the HRSP preemption allows, the NAT network node will start handling traffic before it has completely received all the NAT information.

Therefore there is a need for an improved approach to control switchover from an active network node to a standby network node.

BRIEF DESCRIPTION OF THE DRAWINGS

FIG. 1B is a flow diagram that illustrates a high level overview of a method of dynamically controlling switchover from an active network node to a standby network node.

FIG. 2 is a message flow diagram of example messages that may be used to implement switchover communications and table convergence for a standby network node and an active network node.

DETAILED DESCRIPTION

Figure 1A:
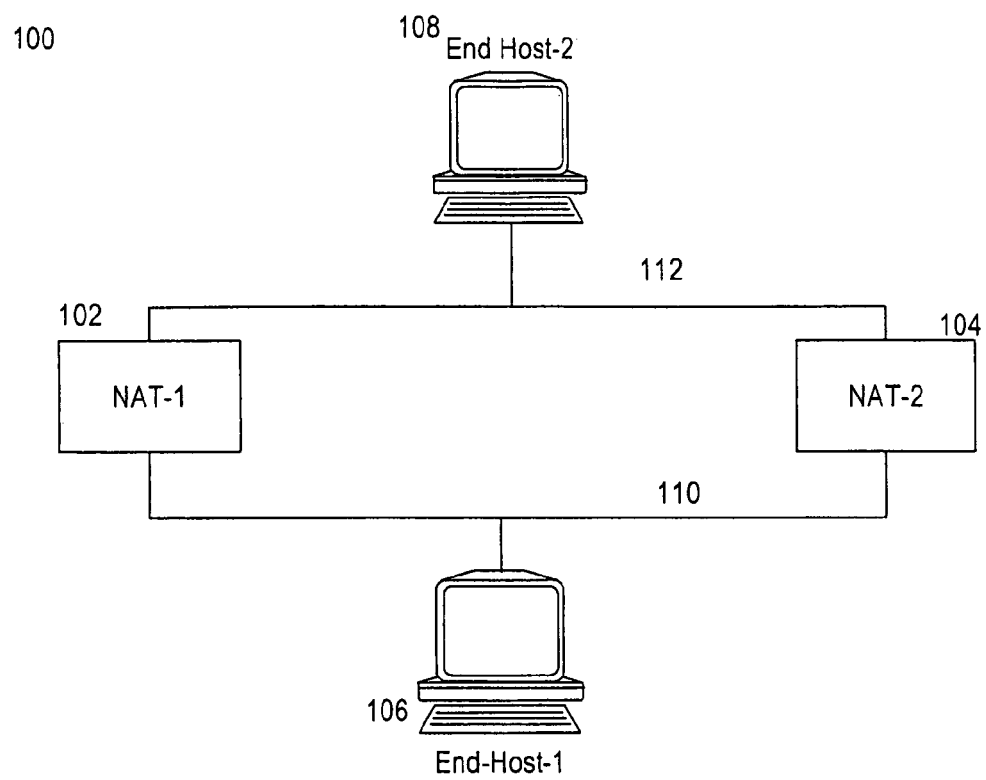
FIG. 1A is a block diagram that illustrates an example network context upon which embodiments of the dynamically controlled switchover from an active node to a standby node may be implemented.

A method and system for dynamically controlling the switchover from an active network node to a standby network node is described. In the following description, for the purpose of explanation, numerous specific details are set forth in order to provide a thorough understanding of the present invention. It will be apparent, however, to one skilled in the art that the present invention may be practiced without these specific details. In other instances, well-known structures and devices are depicted in block diagram form in order to avoid unnecessarily obscuring the present invention.

Embodiments are described herein according to the following outline:

1.0 General Overview
    2.0 Structural and Functional Overview
    3.0 Example Implementation
        3.1 Network Context
        3.2 Peer Nodes Message Exchange
    4.0 Implementation Mechanisms-Hardware Overview
    5.0 Extensions and Alternates

1.0 General Overview

The needs identified in the foregoing Background, and other needs and objects that will become apparent for the following description, are achieved in the present invention, which comprises, in one aspect, a method, comprising the steps of when the standby network node restarts, delaying designation of the standby node as a new active node according to the period of a delay timer; receiving from the active network node a notification identifying a number of data messages that the active network node needs to send to the standby node; storing the number in a counter; receiving the data messages and decrementing the counter as the messages are received; when the delay timer expires, determining if the counter has reached zero, and transitioning the standby network node as the new active node only when the counter has reached zero.

In one feature of this aspect, a standby node is delayed from switching over to an active node for a dynamically determined period of time. The period of time is determined by a counter indicating a number of messages that the standby node should expect to receive from a peer node and switchover delay timer.

In another feature, a counter is set in the standby node based on a notification from the active peer node identifying a number of data messages that the active node will be sending to the standby node. In another feature, the standby node receives a number of data messages from the active node, decrementing the counter for each message received.

In yet another feature, a switchover delay timer is set on the standby node preventing the standby node from becoming active. The expiration of the switchover delay timer triggers a query. The standby node, in response to the query, examines the counter to determine if the counter is zero. If the counter is not yet zero, then the switchover delay timer is restarted. If the counter is zero, then the state of the standby node is switched to active.

2.0 Structural and Functional Overview

Techniques are provided for dynamically controlling a switchover from an active network node to a standby network node, specifically during the convergence of table information. Existing data-flows are processed at the standby node, and the switchover from standby to active is controlled in a dynamic fashion after checking whether the peer network node has converged table information.

The convergence of tables from an active node to a standby node can take a variable period of time, depending on the size of the table. During the convergence period, in an embodiment, traffic continues to flow through the active node and the standby node does not change its state to active until the data flow exchange between the peer nodes is complete. One solution described herein allows for dynamically controlling the switchover from an active node to a standby node based on determining whether or not the peer nodes have converged.

Embodiments implement a global counter that maintains the number of data messages the active node is sending the standby node as part of table convergence. Before the data exchange begins, the active node sends the standby node a message that includes the global counter. The standby node sets a local counter indicating the number of messages it has received. The local counter is initially set equal to the global counter. Upon receiving each data message from the active node, the standby node decrements the counter. This process continues until all the messages have been sent and the counter is zero.

In addition to the global counter, in an embodiment, a preemption timer is set. The state change of the standby node to an active node is preempted for the period of the preemption timer. In order for the state change to occur, two conditions must be met. First, the global counter must be zero, and second, the preemption timer must have expired. In one embodiment, the expiration of the timer triggers a module implementing HSRP to query the standby node about whether all messages have been received. If not all message have been received by the standby node, then the preemption timer is re-set for another increment of time. Alternatively, if the query returns a value indicating that all messages have been received, then the timer is not re-set, and the standby node's state will switch to an active network node.

3.0 Example Implementation

3.1 Network Context

FIG. 1A is a block diagram that illustrates an example network context upon which embodiments of the dynamically controlled switchover from an active node to a standby node may be implemented. A network 100 comprises two NAT enabled routers NAT-1 102 and NAT-2 104. In an embodiment, NAT-1 102 and NAT-2 104 are Stateful NAT (SNAT) peers that border the private network/sub domain 110. For a detailed description of SNAT please see U.S. Provisional Patent Application Ser. No. 60/232,152, filed on Sep. 12, 2000, and entitled "Stateful Network Address Translation Protocol Implemented Over a Data Network." According to one embodiment, End-Host-1 106 communicates with End-Host-2 108, located in the public domain 112, through the SNAT peers.

FIG. 1B is a flow diagram that illustrates a high level overview of a method of dynamically controlling switchover from an active network node to a standby network node. For purposes of illustrating a clear example, the approach of FIG. 1B is described in the context of the example network context of FIG. 1A. However, the approach of FIG. 1B may be implemented in many other network contexts, and is not limited to the specific arrangement of FIG. 1A.

A software module implementing HSRP is configured on the SNAT peers such that the SNAT peers are notified by the HSRP module of whether they are in an active state or standby state. In one embodiment, NAT-1 102 is elected as the active node. Therefore, all traffic between End-Host-1 106 and End-Host-2 108 is conducted through NAT-1 102. NAT-2 104 is elected standby node by the HSRP module.

Once NAT-1 102 is elected the active node, NAT-1 102 creates and distributes all NAT information using the Stateful NAT mechanism to NAT-2 104. NAT-2 104 creates a copy of the same NAT information in its database. In the event that NAT-1 102 goes down, HSRP elects NAT-2 104 as the newly active node. Since NAT-2 104 has maintained the NAT table information from NAT-1 102, packet traffic between End-Host-1 106 and End-Host-2 108 flows without any interruptions. During the time when NAT-2 104 is active, any new NAT session is created and stored in NAT-2's 104 database.

In step 114 of FIG. 1B, a standby node restarts, and the designation of the standby node as a new active node is delayed for a period of time. For example, NAT-1 102 is brought back up, and is delayed from being designated as the newly active node for a period of time. A software delay timer may be used to determine when the delay period expires. NAT-1 102 is delayed because NAT-1 102 must receive an up-to-date version of the NAT table and information before resuming traffic handling. NAT-1 102 puts the HSRP state change on hold until it receives the updated NAT table information. Through the use of a HSRP hello message, NAT-1 102 learns about its peer node, NAT-2 104. NAT-1 102 requests table information from NAT-2 104.

In step 116, a notification is received from the active node, and the notification identifies a number of messages that the active node will send to the standby node. In one embodiment, receiving the request for table information, NAT-2 104 sends NAT-1 102 a notify-message via the Stateful NAT mechanism to tell how many messages to expect. The number of messages will vary depending on the size of the NAT table maintained in NAT-2 104. In step 118, the number of messages is stored in a counter.

In addition to the notification message, NAT-2 104 sets a flag value. The flag is set, until NAT-2 104 receives a complete message from NAT-1 102. The flag value indicates that NAT-2 104 is not to create any new session entries or process any NAT packets on ports which NAT does Application Layer Gateway (ALG) processing. ALG processing is a complex packet screening method. NAT-2 104 then proceeds with sending the requests for table information to NAT-1 102.

At step 120, one or more data messages are received, and the counter of step 118 is decremented as the messages are received. If the NAT-1 102 receives table update messages prior to receiving the Notify-message, then the NAT-1 102 stores such messages in a queue, and starts an HSRP synchronization timer that runs until the NAT-1 102 receives a Notify-message. Thus, in step 120 for table update message NAT-1 102 receives NAT-1 102 decrements the global counter.

When the timer of NAT-1 102 expires a determination is made whether the delay timer of step 114 has expired. If not, then control returns to step 120 to await further data messages. If the timer has expired, then in step 124 a test is performed to determine if the global counter has reached zero. For example, determination is made by NAT-1 102 querying the SNAT process to determine whether NAT-1 102 can change the HSRP state of NAT-1 102 to active or not. If the global counter is not zero, the SNAT process instructs the HSRP module to restart the sync timer, and no HSRP state change will occur. Thus, in step 126, if the delay timer expired but the counter is not zero, then the delay timer is reset and control returns to step 120 at which more data messages may be received.

In step 126 when the global counter reaches zero and the delay timer has expired, NAT-1 102 is transitioned as the new Active node. The SNAT instructs the HSRP module to perform a state transition, and NAT-1 102 will become the active router and NAT-2 104 will become the standby router again. In this approach, NAT-1 102, though destined to be the active router, does not actually become the active router until the router (NAT-2 in this case) from which it is getting up-to-date NAT information has completed transferring the information.

When the global counter decrements to zero, NAT-1 102 sends a "complete" message to NAT-2 104. Upon receipt of the complete message, NAT-2 104 clears the flag that it set upon sending the Notify-message. Since NAT-2 104 was still the HSRP active node during the SNAT convergence-period, traffic flows uninterrupted through NAT-2 104 for packets bearing addresses corresponding to existing NAT table entries.

NAT-1 102 takes over and becomes the active node only after it has received the entire NAT table information from NAT-2 104. This approach ensures that no incorrect traffic handling of existing flows can occur during the switchover.

3.2 Peer Node Message Exchange

FIG. 2 is a message flow diagram of example messages that may be used to implement switchover communications and table convergence for a standby network node and an active network node. In particular, FIG. 2 shows table convergence between a standby node (Router-1) 202 and active node (Router-2) 204. In this example Router-2 204 is switching over from an active network node to a standby network node, thereby making Router-1 202 the newly active node. NAT information has been created and stored during the period Router-2 204 was the active router; therefore, any newly active network node must be informed of the NAT information that was created during this period.

When Router-1 202 boots up, priority information stored as part of the configuration of Router-1 202 requires Router-1 202 to be established as the active router. Since Router-1 202 needs to be informed of any new NAT information since it was last active, upon boot-up, Router-1 202 will be delayed from becoming active until it has received up-to-date information. Therefore, in step 206 Router-1 202 places the HSRP state change (from standby to active) on hold. Conventional HSRP messaging occurs at step 208. In step 210, the HSRP module of Router-1 202 communicates information about its peer node Router-2 204 to the SNAT process hosted at Router-1 202.

Upon learning of peer node Router-2 204, the Router-1 102 triggers a Dump-Request 212, which requests Router-2 204 to provide one or more messages containing NAT table information. Router-2 204, upon receiving the Dump-Request 212, sends a Notify-message 216 to Router-1 202, informing Router-1 202 how many subsequent table dump messages to expect. Router-1 202, upon receiving the Notify-message 216, sends an Acknowledgement 220 back to Router-2 204 and in step 218 sets a counter indicating how many messages it expects to receive from Router-2 204.

In addition to sending the notification message, in step 216 Router-2 204 also sets a flag. The flag prevents Router-2 204 from creating any new NAT table entries and processing any NAT packets on ports on which NAT does Application Layer Gateway processing, a complex packet screening method, until Router-2 202 receives the Dump-complete message from Router-1 (Step 232). Router-2 204 sends one or more Dump-Reply messages 222 containing all the NAT table information that is stored at Router-2 204.

For each Dump-reply message 222 that is received, Router-1 202 performs two steps: 1) In step 224, Router-1 202 decrements the counter that was initially established at step 218 and 2) Router-1 202 sends an acknowledgement 226 indicating that Router-1 202 has received the corresponding Dump-Reply message 222.

For purposes of illustrating a clear example, assume that at step 228, Router-1's 202 HSRP timer expires. In other embodiments, the HSRP timer could expire at other points in the process of FIG. 2. In response, at step 228 the HSRP module of Router-1 202 performs a query of the SNAT-1 process to determine whether it can change the HSRP state or not. In response, the SNAT-1 process determines whether the counter set in step 218 is zero, indicating that all Dump-Reply messages have been received. If the Router-1 202 has not yet received all expected Dump-Reply messages, then the SNAT-1 process instructs the HSRP module to restart the timer, in step 230, and thus, no HSRP state change will occur. This process will continue to repeat until the query in step 228 indicates that all messages have been received by Router-1 202.

Upon receiving all the Dump-Reply messages 222, Router-1 202 sends a Dump-Complete message 232 to Router-2 204. At this point the counter set in step 218 will be zero. When the HSRP timer expires in step 236, a query from the HSRP module to the SNAT-1 process returns a value indicating that all messages have been received by Router-1 202. Therefore, the SNAT-1 process will permit the HSRP module to undergo a state change; in step 238 the HSRP module sends an active notification to Router-1 202 to perform the state-transition change and Router-1 202 will become the active router as indicated at step 240.

Additionally, Router-2 204 will become the standby router by means of its own HSRP standby notification message 242. Furthermore, the Dump-Complete message sent to Router-2 204 in step 232 will cause Router-2 204 to unset the flag 234 that was previously set in step 216. At step 240 the state change switchover occurred and Router-1 202 is now active and Router-2 204 is the standby node.

4.0 Implementation Mechanisms

Hardware Overview

Figure 3:
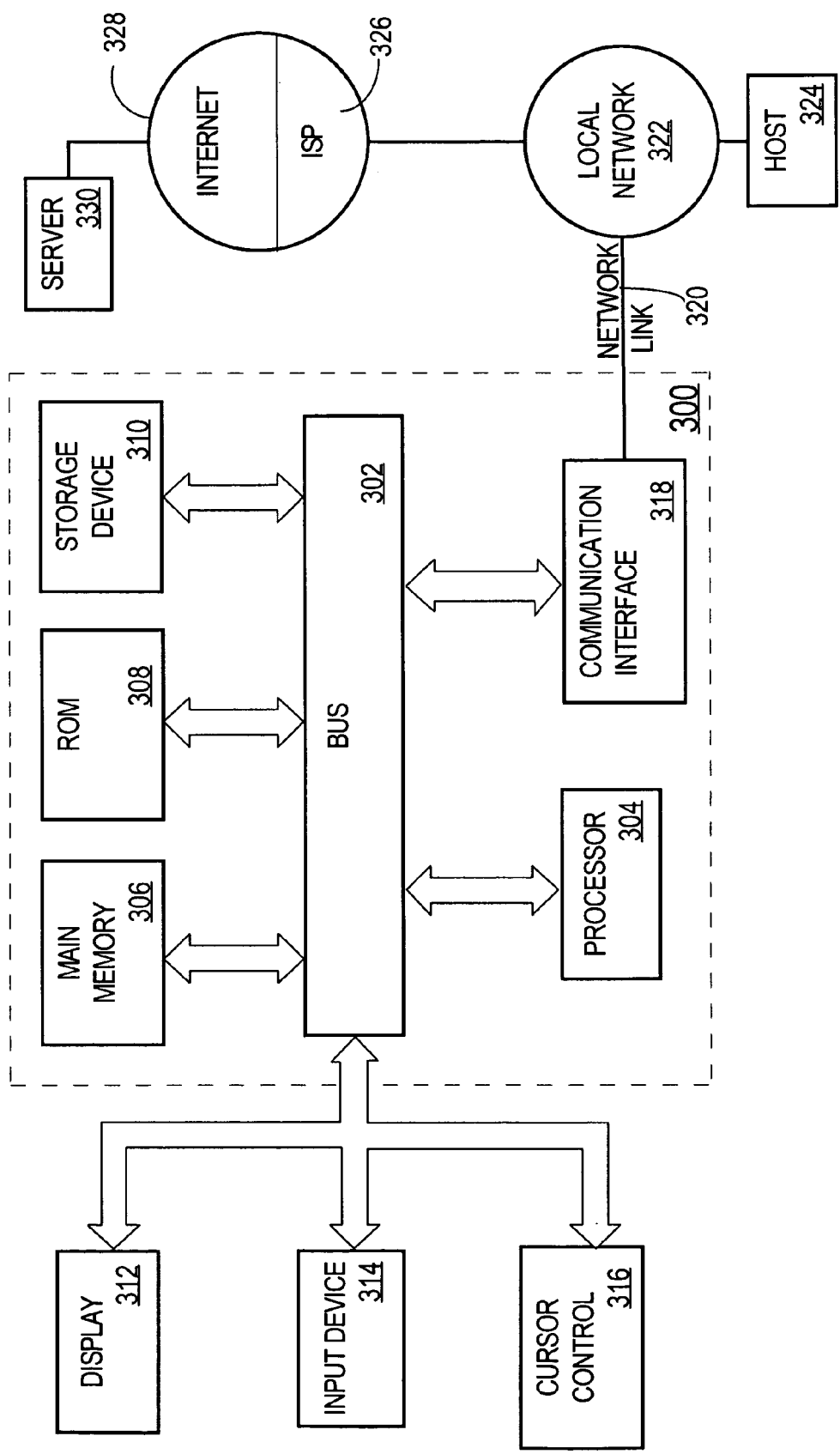
FIG. 3 is a block diagram that illustrates a computer system upon which an embodiment may be implemented.

FIG. 3 is a block diagram that illustrates a computer system 300 upon which an embodiment of the invention may be implemented. The preferred embodiment is implemented using one or more computer programs running on a network element such as a router device. Thus, in this embodiment, the computer system 300 is a router.

Computer system 300 includes a bus 302 or other communication mechanism for communicating information, and a processor 304 coupled with bus 302 for processing information. Computer system 300 also includes a main memory 306, such as a random access memory (RAM), flash memory, or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk, flash memory or optical disk, is provided and coupled to bus 302 for storing information and instructions.

A communication interface 318 may be coupled to bus 302 for communicating information and command selections to processor 304. Interface 318 is a conventional serial interface such as an RS-232 or RS-322 interface. Display 312, input device 314, and cursor control 316 are also coupled to bus 302. Firmware or software running in the computer system 300 provides a terminal interface or character-based command interface so that external commands can be given to the computer system.

A switching system 316 is coupled to bus 302 and has an input interface 314 and an output interface 319 to one or more external network elements. The external network elements may include a local network 322 coupled to one or more hosts 324, or a global network such as Internet 328 having one or more servers 330. The switching system 316 switches information traffic arriving on input interface 314 to output interface 319 according to pre-determined protocols and conventions that are well known. For example, switching system 316, in cooperation with processor 304, can determine a destination of a packet of data arriving on input interface 314 and send it to the correct destination using output interface 319. The destinations may include host 324, server 330, other end stations, or other routing and switching devices in local network 322 or Internet 328.

The term "machine-readable medium" as used herein refers to any medium that participates in providing instructions to processor 304 for execution. Such a medium may take many forms, including but not limited to, non-volatile media, and volatile media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302.

Common forms of machine-readable media include, for example, a floppy disk, a flexible disk, hard disk, magnetic tape, or any other magnetic medium, a CD-ROM, any other optical medium, punch cards, a RAM, a PROM, and EPROM, a FLASH-EPROM, any other memory chip or cartridge.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector coupled to bus 302 can receive the data carried in the infrared signal and place the data on bus 302. Bus 302 carries the data to main memory 306, from which processor 304 retrieves and executes the instructions. The instructions received by main memory 306 may optionally be stored on storage device 310 either before or after execution by processor 304.

Communication interface 318 also provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the worldwide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of controlling switchover from an active network node to a standby network node, comprising:
   when the standby network node restarts, delaying designation of the standby node as a new active node according to the period of a delay timer;
   receiving from the active network node a notification identifying a number of data messages that the active network node needs to send to the standby node;
   storing the number in a counter;
   receiving the data messages and decrementing the counter as the messages are received;
   when the delay timer expires, determining if the counter has reached zero, and transitioning the standby network node as the new active node only when the counter has reached zero;
   wherein the method is performed by one or more computer systems.

2. The method of claim 1 wherein a value of the delay timer is established before the standby network node restarts.

3. The method of claim 1 wherein the notification identifying a number of data messages is sent by the active node in response to a request for network address translation data contained in the active network node.

4. The method of claim 3 further comprising:
   responding to the request for data information by preventing creation of any new data information until the request for data is complete.

5. The method of claim 1 wherein if the counter has not yet reached zero then re-setting the delay timer for an additional period of time.

6. The method of claim 1 wherein if the counter has reached zero then the standby node sends a complete message to the active node.

7. The method of claim 6 wherein the active node permits creation of new data in response to receiving said complete message.

8. The method of claim 1 wherein transitioning the standby network node as the new active node is performed by HSRP state transition logic.

9. The method of claim 1 wherein the transitioning of the standby network node as the new active node also results in the transitioning of the active node as the new standby node.

10. A machine-readable volatile or non-volatile medium storing one or more sequences of instructions for controlling switchover from an active network node to a standby network node, wherein execution of the one or more sequences of instructions by one or more processors causes:
    when the standby network node restarts, delaying designation of the standby node as a new active node according to the period of a delay timer;
    receiving from the active network node a notification identifying a number of data messages that the active network node needs to send to the standby node;
    storing the number in a counter;
    receiving the data messages and decrementing the counter as the messages are received;
    when the delay timer expires, determining if the counter has reached zero, and transitioning the standby network node as the new active node only when the counter has reached zero.

11. A machine-readable volatile or non-volatile medium as recited in claim 10 wherein a value of the delay timer is established before the standby network node restarts.

12. A machine-readable volatile or non-volatile medium as recited in claim 10 wherein the notification identifying a number of data messages is sent by the active node in response to a request network address translation for data contained in the active network node.

13. A machine-readable volatile or non-volatile medium as recited in claim 12 wherein execution of the one or more sequences of instructions by one or more processors further causes:
    responding to the request for data information by preventing creation of any new data information until the request for data is complete.

14. A machine-readable volatile or non-volatile medium as recited in claim 10 wherein if the counter has not yet reached zero then re-setting the delay timer for an additional period of time.

15. A machine-readable volatile or non-volatile medium as recited in claim 10 wherein if the counter has reached zero then the standby node sends a complete message to the active node.

16. A machine-readable volatile or non-volatile medium as recited in claim 15 wherein the active node permits creation of new data in response to receiving said complete message.

17. A machine-readable volatile or non-volatile medium as recited in claim 10 wherein transitioning the standby network node as the new active node is performed by HSRP state transition logic.

18. A machine-readable volatile or non-volatile medium as recited in claim 10 wherein the transitioning of the standby network node as the new active node also results in the transitioning of the active node as the new standby node.

19. An apparatus comprising:
one or more processors;
one or more sequences of instructions stored in a volatile or non-volatile medium for controlling switchover from an active network node to a standby network node, which instructions, when executed by the one or more processors, are operable to:
when the standby network node restarts, delay designation of the standby node as a new active node according to the period of a delay timer;
receive from the active network node a notification identifying a number of data messages that the active network node needs to send to the standby network node;
store the number in a counter;
receive the data messages and decrement the counter as the data messages are received;
when the delay timer expires, determine if the counter has reached zero, and transition the standby network node as the new active node only when the counter has reached zero.

20. The apparatus of claim 19, wherein the one or more sequences of instructions further comprise instructions which, when executed by the one or more processors, are operable to establish the value of the delay timer before the standby network node restarts.

21. The apparatus of claim 19, wherein the one or more sequences of instructions further comprise instructions which, when executed by the one or more processors, are operable to:
send a request for network address translation data that is contained in the active network node; and
receive the notification identifying the number of data messages from the active network node in response to the request.

22. The apparatus of claim 21, wherein the instructions operable to send the request for the network address translation data are further operable to cause the active network node to respond to the request by preventing creation of any new network address translation data until the data messages are received.

23. The apparatus of claim 19, wherein the one or more sequences of instructions further comprise instructions which, when executed by the one or more processors, are operable to re-set the delay timer for an additional period of time if the counter has not yet reached zero.

24. The apparatus of claim 19, wherein the one or more sequences of instructions further comprise instructions which, when executed by the one or more processors, are operable to send a complete message to the active network node if the counter has reached zero.

25. The apparatus of claim 24, wherein the instructions operable to send the complete message are further operable to cause the active network node to permit creation of new network address translation data in response to the complete message.

26. The apparatus of claim 19, wherein the instructions operable to transition the standby network node as the new active node are included in HSRP state transition logic.

27. The apparatus of claim 19, wherein the instructions operable to transition the standby network node as the new active node are further operable to cause the active network node to transition as a new standby node.

* * * * *

UNITED STATES PATENT AND TRADEMARK OFFICE
CERTIFICATE OF CORRECTION

PATENT NO.      : 7,609,618 B1                                              Page 1 of 1
APPLICATION NO. : 11/303555
DATED           : October 27, 2009
INVENTOR(S)     : Biswas et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 985 days.

Signed and Sealed this

Twelfth Day of October, 2010

David J. Kappos
*Director of the United States Patent and Trademark Office*